United States Patent [19]

Yang

[11] Patent Number: 5,140,343
[45] Date of Patent: Aug. 18, 1992

[54] COMPOSITIVE FUNCTIONAL LASER PRINTER

[75] Inventor: Keun Y. Yang, Seoul, Rep. of Korea

[73] Assignee: Goldstar Co., Ltd., Seoul, Rep. of Korea

[21] Appl. No.: 514,211

[22] Filed: Apr. 25, 1990

[30] Foreign Application Priority Data

Apr. 29, 1989 [KR] Rep. of Korea ............... 5856/1989

[51] Int. Cl.$^5$ ............................................. H04N 1/21
[52] U.S. Cl. .................................. 346/108; 358/296; 359/221
[58] Field of Search .............. 346/108, 107 R, 160; 350/6.2, 3.71, 3.72; 359/196, 197, 226, 221; 358/296

[56] References Cited

U.S. PATENT DOCUMENTS 4,487,472 12/1984 Asano ............................ 350/3.71
4,488,042 12/1984 Clay et al. ...................... 250/235

*Primary Examiner*—Mark J. Reinhart
*Attorney, Agent, or Firm*—Rosen, Dainow & Jacobs

[57] ABSTRACT

A compositive functional laser printer which is made not only to form a picture on a photo-sensitive drum but also to read out a manuscript by scanning laser beam by using a hologram disk. The laser printer comprises a laser beam generator, a beam splitting unit, a beam diffractive scanning unit, a picture forming signal control unit, a manuscript reading signal control unit, and a signal detecting and storing unit, so that a picture is formed on the photo-sensitive drum, as well as the content of manuscript can be read. According to the invention, since printing function as well as manuscript reading function can be carried out, functions of duplicator, facsimile and laser printer can be carried out by one instrument, therefore the low cost of optical unit can be obtained and the product can be miniaturized.

5 Claims, 3 Drawing Sheets

COMPOSITIVE FUNCTIONAL LASER PRINTER

BACKGROUND OF THE INVENTION

The present invention relates to a laser printer, and particularly to a compositive functional laser printer which is made to read a manuscript or to form a picture on a photo-sensitive drum by scanning laser beam by using a hologram disk.

A conventional laser printer is constituted with a laser beam to be outputted from the laser beam scanning optical unit in response to the contents desired to print, and a printing unit for printing by means of forming the picture on a photo-sensitive drum in accordance with the laser beam applied from said laser beam scanning optical unit.

Such a conventional laser printer will be explained by illustrating a typical exemplary form in FIGS. 1 and 2.

In the drawings, reference numeral 1 represents a laser beam scanning optical unit, 10 represents a printing unit, and 24 represents a computer, wherein said laser beam scanning optical unit 1 is constituted with a laser beam generator 2 for generating the laser beam, a collimator 3 for changing the laser beam into a parallel light, a cylindrical lens 4 for converging the parallel light passed through said collimator 3 to a rotary polyhedric mirror 5, compensation lenses 7 and 8 for compensating to make the laser beam reflected at said rotary polyhedric mirror 5 to be focused in correct picture on the photo-sensitive drum 11, and a reflective mirror 9 for deflecting the laser beam passed through said compensation lenses 7 and 8 on to the photo-sensitive drum 11.

And, said rotary polyhedric mirror 5 is rotated by a driving force of a driving motor 6, and said compensation lenses 7 and 8 have at least one toric surface.

The printing unit 10 comprises a photo-sensitive drum 11 on which the laser beam applied from said laser beam scanning optical unit 1 is focused, an electrifier 12, a developer 13, a transfer printer 14, a separator 15, an electricity remover 16, a fixing heater 17, and a cleaner arranged around the photo-sensitive drum 11 as well as a paper feeding, conveying and discharging means, the paper feeding, conveying and discharging means includes a cassette 19, paper feeding rollers 20, paper discharging rollers 21 and a paper discharging tray 22.

In the drawings, reference numeral 1' represents a casing of the laser beam scanning optical unit 1, and 23 represents a paper conveying guide.

According to the conventional laser printer as described above, a laser generator 2 emits a laser beam while it is turned to ON/OFF in response to the picture signal received from a computer 24, and the emitted laser beam is converted into a parallel light by the collimator 3 and converged on the mirror surface of the rotary polyhedric mirror 5 by the cylindrical lens 4.

And, the laser beam 1 converged to said rotary polyhedric mirror 5 is reflected at various angles as said rotary polyhedric mirror 5 is rotated by the driving force of the driving motor 6 and passing through the compensation lenses 7 and 8 and then scanned in the direction of arrow in FIG. 2, and this laser beam is deflected by the reflective mirror 9 whereby being converged on the photo-sensitive drum 11.

Wherein the compensation lenses 7 and 8 compensate the focal locus from a curved line to a straight line when the laser beam is converged and scanned on the photo-sensitive drum 11 and also compensate the laser beam being moved slightly perpendicular to the scanning plane due to an inclination of the mirror surface of the rotary polyhedric mirror 5 or a vibration of the mirror surface when the rotary polyhedric mirror 5 turns.

After the laser beam is focused on the photo-sensitive drum 11, printing is executed by the well known general printing process.

According to the conventional laser printer described above, since the toric lens and the cylindrical lens used in the laser beam scanning optical unit are difficult in working process, it has been a factor for increasing the cost of unit, and since the rotary polyhedric mirror is not only disadvantageous for mass production but also high in cost, the cost of unit has been further raised and productivity has been reduced. Moreover, according to such a conventional laser printer, since the laser beam scanning optical unit has a simple function of forming a picture on the photo-sensitive drum, it has been impossible to be used for use of other than a printer.

SUMMARY OF THE INVENTION

Therefore, it is an object of the present invention to provide a compositive functional laser printer having a picture forming function together with a manuscript reading out function by which the laser beam generated from a laser beam generator is separated into a picture forming laser beam and a manuscript reading laser beam upon the control of a computer, thereby making possible either to form a picture on the photo-sensitive drum or to read out the contents of the manuscript.

BRIEF DESCRIPTION OF THE DRAWINGS

FIG. 2 is a schematic plane view of a laser beam scanning optical unit which is an essential part of the conventional laser printer of FIG. 1, FIGS. 3 to 7 are diagrams for illustrating the constitution and operation of a compositive functional laser printer of the present invention, wherein.

DETAILED DESCRIPTION OF THE INVENTION

Hereinafter, the present invention will be described in detail with reference to the FIGS. 3 to 7.

Figure 1:
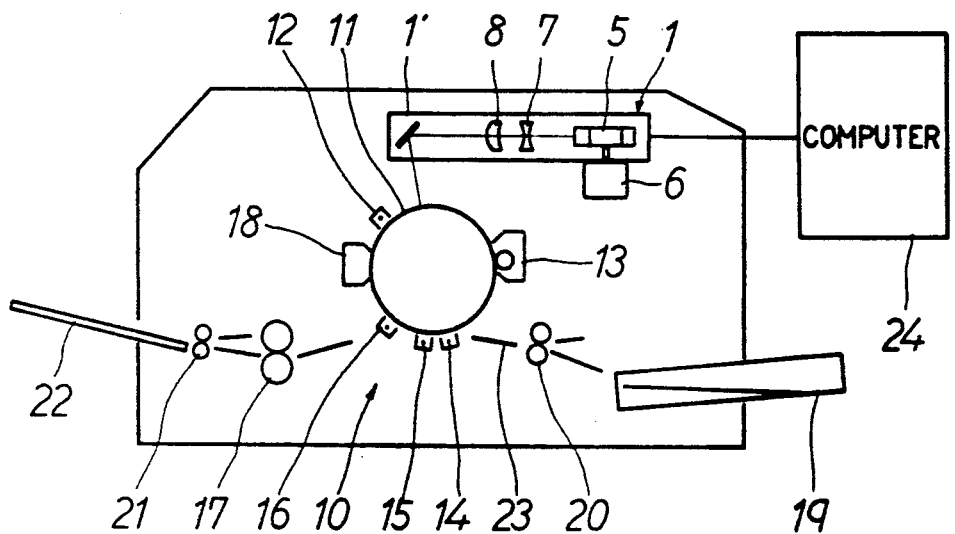
FIG. 1 is a cross sectional view of a conventional laser printer.
Figure 2:
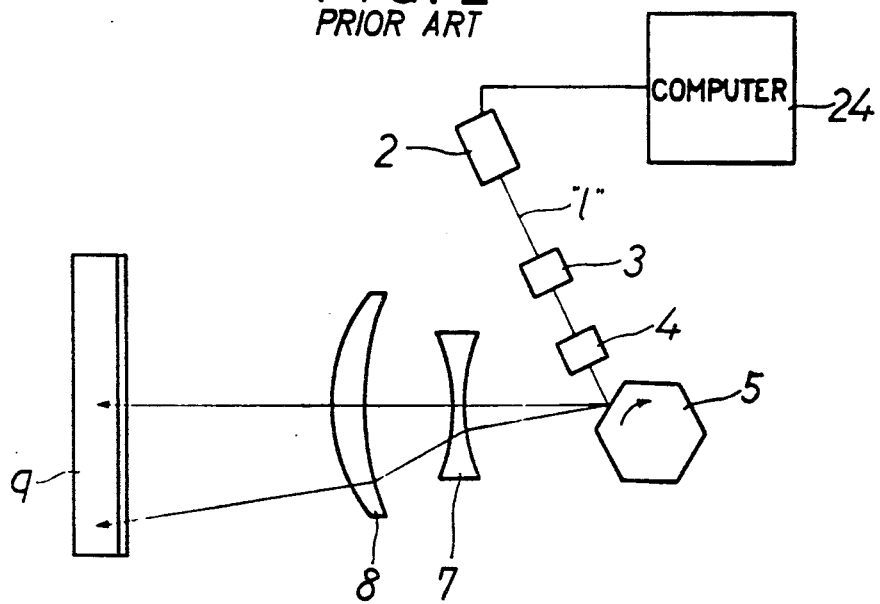
Figure 3:
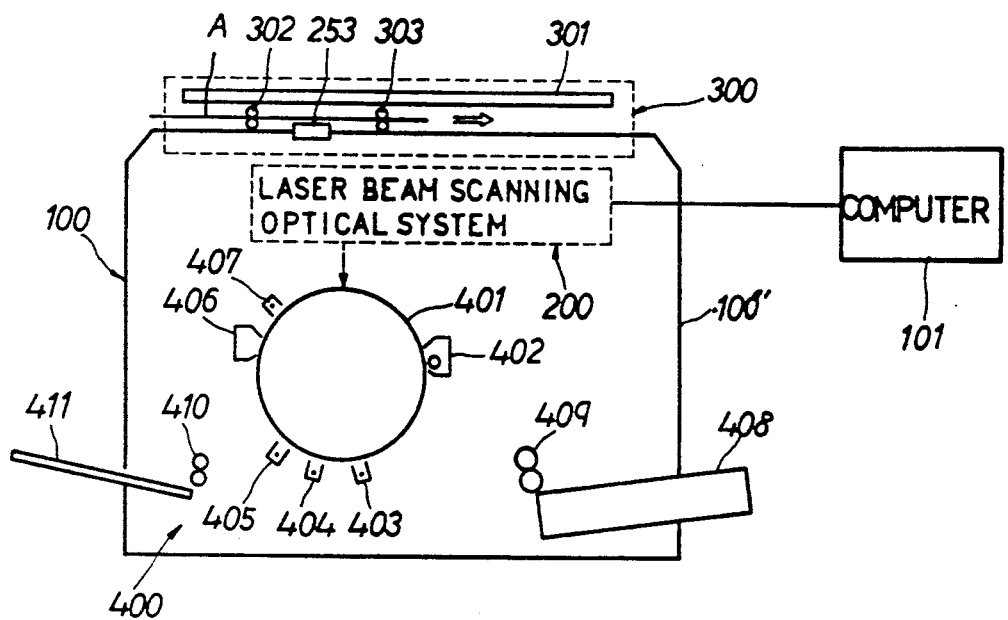
FIG. 3 is a schematic cross sectional view illustrating the entire configuration of the compositive functional laser printer of the present invention.
Figure 4:
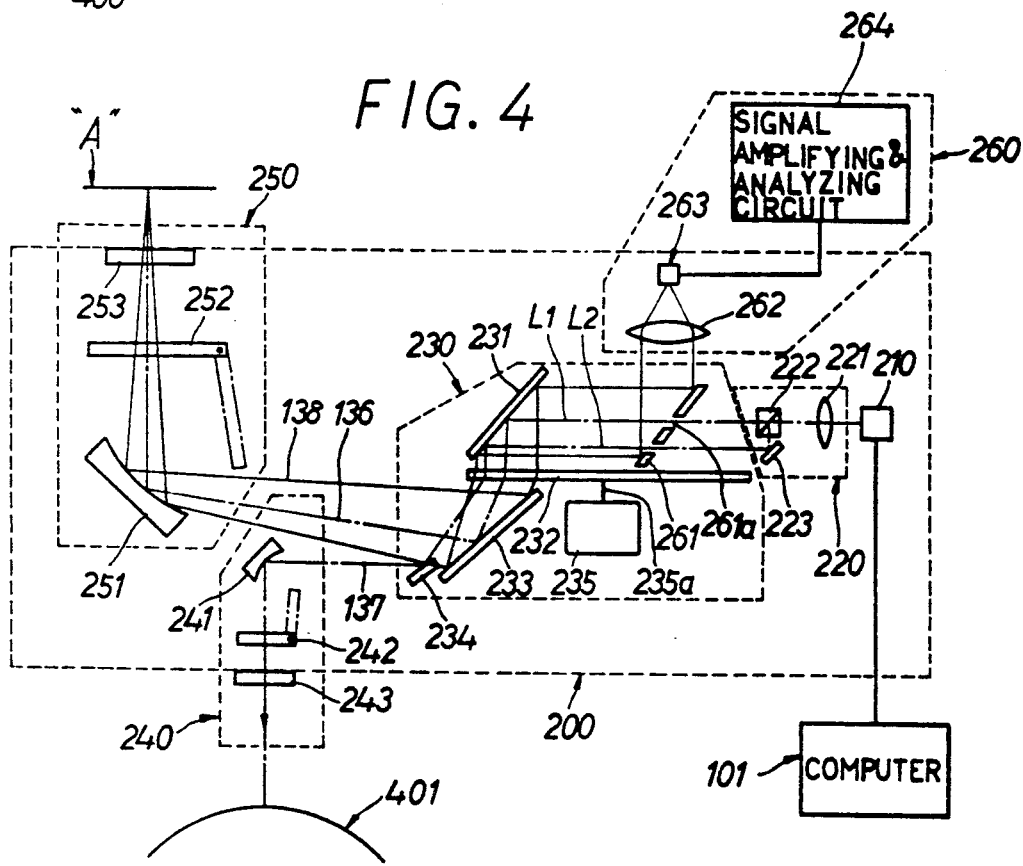
FIG. 4 is a schematic cross sectional view of the laser beam scanning optical unit of FIG. 3.

At first, referring to FIGS. 3 and 4, the laser printer of the present invention is constituted generally with a main body 100, a laser beam scanning optical unit 200, a manuscript loading unit 300, and a printing unit 400.

The laser beam scanning optical unit 200 comprises a beam generator 210 for generating a laser beam L upon the control of computer 101, a beam splitting unit 220 for splitting the laser beam L generated from said laser beam generator 210 into a picture forming laser beam L2 and a manuscript reading laser beam L1, a beam diffractive scanning unit 230 for controlling the advancing direction of the beams by diffracting and scanning the manuscript reading laser beam L2 and the picture forming laser beam L2, a picture forming signal control unit 240 for forming a picture by scanning the picture forming laser beam L2 on the photo-sensitive drum 401 of the printing unit 400 so as the printing to be executed, a manuscript reading signal control unit 250 for scanning the manuscript reading laser beam L1 on a manuscript loaded on the manuscript loading unit 300 so as the content of the manuscript to be read out, and a signal detecting and storing unit 260 for detecting the signal readout from the manuscript, and then amplifying, analyzing and storing thereof.

The beam splitting unit 220 comprises a collimator 221 for changing the laser beam L generated from said laser beam generator 210 into a parallel light, a beam splitter 222 for splitting the laser beam L passed through said collimator 221 into a picture forming laser beam L2 and a manuscript reading laser beam L1, and a reflective mirror 223 for changing the light path of the laser beams L1 and L2.

The beam diffractive scanning unit 230 comprises a reflective mirror 231 for changing the light path of the laser beams L2 and L1 passed through the reflective mirror 223, a rotary hologram disk 232 for scanning by diffracting said picture forming laser beam L2 and said manuscript reading laser beam L1 reflected at said reflective mirror 231, a reflective mirror 234 for changing the light path of the manuscript reading laser beam L1 out of the laser beams L1 and L2 passed through said rotary hologram disk 232, and a reflective mirror 234 for changing the light path of the picture forming laser beam L2, wherein said rotary hologram disk 232 is made to rotate by being fixed to a motor shaft 235a of the driving motor 235.

The picture forming signal control unit 240 comprises a concave reflective mirror 241 for compensating the picture forming laser beam, L2 passed through the reflective mirror 234, a shutter 242 for cutting off or opening the advancing path of the picture forming laser beam L2 reflected at said concave reflective mirror 241, and a window 243 for allowing the picture forming laser beam L2 passed through said shutter 242 to be incident upon the photo-sensitive drum 401.

The manuscript reading signal control unit 250 comprises a concave reflective mirror 251 for compensating the manuscript reading laser beam L1 passed through said reflective mirror 233, a shutter for cutting off or opening the advancing path of the manuscript reading laser beam L1 reflected at said concave reflective mirror 251, and a window 253 for allowing the manuscript reading laser beam L1 passed through said shutter means 252 to be incident upon the manuscript A.

The manuscript loading unit 300 is constituted such a manner that paper feeding rollers 302 and paper discharging rollers 303 are provided so as to convey the manuscript A, and a cover 301 is provided at the upper side thereof.

The printing unit 400 includes a photo-sensitive drum 401, and a developer 402, a transfer printer 403; a separator 404, an electricity remover 405, a cleaner 406 and an electrifier 407 arranged around thereof, and further includes paper feeding rollers 409 for feeding a printing paper contained in a cassette 408, paper discharging rollers 410 for discharging the paper and paper discharging tray 411.

The signal detecting and storing unit 260 comprises a reflective mirror 261 for changing the light path of the manuscript reading laser beam L1 reflected at said manuscript A and passed through sequentially the window 253, shutter means 252, concave reflective mirror 251, reflective mirror 233, rotary hologram disk 232, and reflective mirror 231, a converging lens 252 for converging the manuscript reading laser beam L reflected at said reflective mirror 261, a beam detector 263 for detecting the detected beam, and a signal amplifying and analyzing unit 264 for amplifying, analyzing and storing the detected signal.

Referring to FIG. 3, the printing unit 400 is mounted at the central portion and lower portion of the main body 100 of apparatus, the manuscript loading unit 300 is mounted at the top end portion of the main body 100, and the laser beam scanning optical unit 200 is mounted between the manuscript loading unit 300 and the printing unit 400.

Reviewing the arranging structure of the laser beam scanning optical unit with reference to FIG. 4, reflective mirrors 231 and 261 are mounted slantingly above said rotary hologram disk 232, beam splitter 222, collimator 221 and laser beam generator 210 are mounted on the same axial line at one side of the reflective mirror 231, and reflective mirrors 233 and 234 are mounted at the proximity of one side of lower portion of said reflective mirror 231 and the rotary hologram disk 232.

And, concave reflective mirrors 241 and 251 are mounted at opposite side portion of said reflective mirrors 233 and 234, concave reflective mirror 241 and shutter 242 are mounted on the same axial line toward bottom window 243, and concave reflective mirror 251 and shutter 252 are mounted toward the top window 253.

The reflective mirror 261 located between the reflective mirrors 223 and 231 and is formed with holes 261a for passing through the laser beams L1 and L2 splitted at said beam splitter 222, and a converging lens 262 and a beam detector 263 are mounted above the reflective mirror 261, and said beam detector 263 and signal amplifying and analyzing circuit 264 are electrically connected together.

Figure 5:
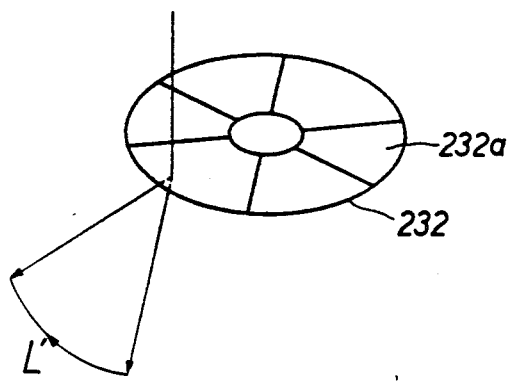
FIG. 5 is a schematic diagram illustrating a scanning operation of laser beam according to a rotary hologram disk.

FIG. 5 shows the constitution and operation of the rotary hologram disk 232. As shown in FIG. 5, the rotary hologram disk 232 is consisted of a plurality of holograms 232a, and when the laser beams L1 and L2 are made to be incident thereon while turning said rotary hologram disk 232 at a predetermined speed, the laser beams L1 and L2 are diffracted by passing through the rotary hologram disk 232 whereby being scanned in the form of bent scanning line L'.

Figure 6:
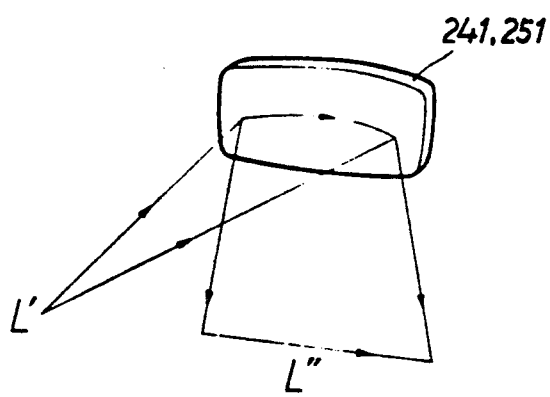
FIG. 6 is a schematic diagram illustrating a scanning compensatory operation of laser beam according to a concave reflective mirror.

FIG. 6 shows the operation of the concave reflective mirrors 241 and 251. As shown in FIG. 6, the laser beams L1 and L2 scanned in the form of bent scanning line L' by passing through said rotary hologram disk 232 are compensated into straight scanning line L'' by being made to be incident upon the concave reflective mirrors 241 and 251 and then reflected therefrom.

Figure 7:
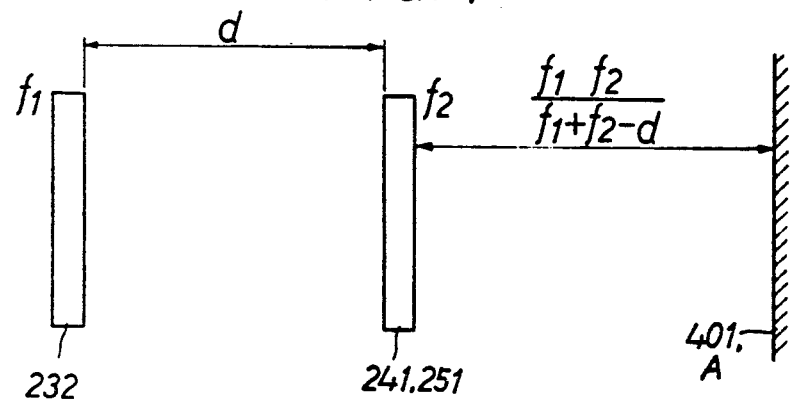
FIG. 7 is an explanatory view illustrating the relation of distances among rotary hologram disk, concave reflective mirrors, photo-sensitive drum, and a manuscript.

FIG. 7 is a schematic diagram for illustrating the relations of distance among the rotary hologram disk 232, concave reflective mirrors 241 and 251, the photo-sensitive drum 401, and the manuscript A. As shown in FIG. 7, assuming that the focus of the hologram of the rotary hologram disk 232 is represented by $f_1$, and the focus of the concave reflective mirrors 241 and 251 is $f_2$, and the distance between the rotary hologram disk 232 and the concave reflective mirrors 241 and 251 is represented by d, distance between each part is set so as to satisfy the following expression:

$$\frac{f_1 \cdot f_2}{f_1 + f_2 - d} \quad (1)$$

According to the compositive functional laser printer of the present invention constituted as described above, when a laser beam L is generated from the laser beam generator 210 upon the control of the computer 101, said laser beam L becomes to a parallel light by the collimator 221, and the parallel light is splitted into a picture forming laser beam L2 and a manuscript reading laser beam L1, whereby being utilized respectively to a picture forming operation and a manuscript reading operation.

Firstly, the picture forming operation of such two kinds of operations will be described in detail.

The picture forming laser beam L2 thus splitted by the beam splitter 222 is incident perpendicular to the rotary hologram disk 232 by the reflective mirrors 223 and 231 and diffracted by the hologram 232a of the rotary hologram disk 232, and then scanned as shown in FIG. 5, according as the rotary hologram disk 232 is rotated at a predetermined speed by the driving force of the driving motor 235.

At this time, the picture forming laser beam L2 is scanned in the form of bent scanning line L' as shown in FIG. 5, and then, after passing through the reflective mirror 234 and the concave reflective mirror 241, accordingly being compensated into the form of straight scanning line L'', and this compensated picture forming laser beam L2 is scanned through the shutter 242 and the window 243 on the photo-sensitive drum 401.

Thus, in case when the picture forming laser beam L2 is scanned on the photo-sensitive drum 401, a picture is formed on the photo-sensitive drum 401 by turning ON/OFF the laser beam generator 210 upon the control of the computer 101, and thereafter the printing operation is carried out by the printing process as conventional case.

Next, the manuscript reading-out operation will be described in detail.

The manuscript reading laser beam L1 splitted by the beam splitter 222 is incident perpendicularly upon the rotary hologram disk 232 by the reflective mirror 231, and then scanned on the manuscript A of the manuscript loading unit 300 through the reflective mirror 233, concave reflective mirror 251, shutter 252 and window 253.

At this time, the manuscript A is conveyed by paper feeding rollers 202 and paper discharging rollers 303, the manuscript reading laser beam L1 diffused from the manuscript A advances inversely the path having been passed whereby directing toward the converging lens 262 by the reflective mirror 261, and the manuscript reading laser beam L1 converged at the converging lens 262 is incident upon the beam detector 263.

The intensity of the manuscript reading laser beam L1 being incident upon said beam detector 263 varies depending upon the bright and dark. That is, on the surface of the manuscript A, wherein dark portion having a picture absorbs much the manuscript reading laser beam L1, and bright portion having no picture absorbs less, therefore the intensity of diffused manuscript reading laser beam L1 becomes different according to the picture of the manuscript A, and the beam detector 263 becomes to detect the intensity of such manuscript reading laser beam L1.

Thus, when the beam detector 263 detects the intensity of the manuscript reading laser beam L1, said detected signal is transferred to the signal amplifying and analyzing circuit 264, and being amplified, analyzed and stored whereby the manuscript reading operation is completed.

And, when the beam scanning optical unit 200 is operated as described above, the operations of printing and manuscript inputting etc. are carried out, wherein at the time of printing function, the shutter 242 of the picture forming signal control unit 240 is opened, and the shutter 252 of the manuscript reading signal control unit 250 is closed, while at the time of the manuscript inputting, the operations opposite to the above are carried out.

Inasmuch as the present invention as described above in detail is constituted so as to be able to execute the printing function and manuscript reading function by constituting the laser beam scanning optical unit with a combination of the hologram disk, a concave reflective mirror, and the like, the functions of duplicating apparatus, facsimile and laser printer can be executed by one apparatus, and there is also the effect that the cost down of the optical unit can be obtained and the product can be miniaturized.

What is claimed is:

1. A composite functional laser printer comprising:
   a laser beam generator means for generating a laser beam according to control signals from a computer;
   a beam splitter means for splitting the laser beam into a picture forming laser beam and a manuscript reading laser beam;
   a beam diffractive scanning means for controlling the advancing direction by diffracting and scanning said laser beams,
   said scanning means comprises a rotary hologram disk means for diffracting and scanning the picture forming laser beam and the manuscript reading laser beam, and reflective mirror means for changing the light path of the laser beams;
   a picture forming signal control means for forming a picture by causing the laser beam to be incident upon a photo-sensitive drum of a printing unit;
   a manuscript reading signal control means for causing the laser beam to be incident upon a manuscript loading means,
   said picture forming means and manuscript reading means comprise first and second concave reflective mirrors for compensating the laser beams so that they are scanned in the form of a straight scanning line; and
   a signal detecting and storing means for detecting amplifying, analyzing and storing the read-out manuscript signal, whereby forming a picture on the photo-sensitive drum and reading out the content of the manuscript.

2. The composite functional laser printer according to claim 1, wherein the picture forming means and the manuscript reading means comprises:

first and second shutters for cutting off or opening the advancing path of the laser beams so as the laser beams passed through said concave reflective mirrors to be directed to a first and second windows, respectively.

3. The composite functional laser printer according to claim 2, wherein said rotary hologram disk, concave reflective mirrors, manuscript and photo-sensitive drum positioned according to the following relationship, $$\frac{f_1 \cdot f_2}{f_2 + f_2 - d},$$

wherein, $f_1$ being the focus of the hologram of the rotary hologram disk, $f_2$ being each focus of the concave reflective mirrors, and d being the distance between the rotary hologram disk and the concave reflective mirrors.

4. The composite functional laser printer according to claim 1, wherein the beam splitting means comprises:
a collimator for making in parallel the laser beam generated from the laser beam generator,
a beam splitter for splitting the laser beam passed through said collimator into a picture forming laser beam and a manuscript reading laser beam, and
a reflective mirror for changing the light path of the laser beams.

5. The composite functional laser printer according to claim 2, wherein:
said manuscript loading means includes paper feeding rollers and paper discharging rollers so that the manuscript is conveyed on the window.

* * * * *